United States Patent [19]
Walker

[11] Patent Number: 5,796,035
[45] Date of Patent: Aug. 18, 1998

[54] CONDUIT DRAIN FOR USE IN NON-HAZARDOUS LOCATIONS

[76] Inventor: Patrick A. Walker, 802 Riedel, Houston, Tex. 77024

[21] Appl. No.: 615,537

[22] Filed: Mar. 12, 1996

[51] Int. Cl.[6] .................................................. H02G 3/04
[52] U.S. Cl. .......................... 174/48; 138/109; 210/446; 210/448; 210/449; 210/460
[58] Field of Search ................ 174/50, 48, 17 VA, 174/17 R, 23 R; 220/371, 372, 373; 138/109, 96 T, 96 R; 285/354; 191/26; 210/446, 448, 449, 460

[56] References Cited

U.S. PATENT DOCUMENTS

| | | | |
|---|---|---|---|
| 1,074,375 | 9/1913 | Miller | 210/446 |
| 1,800,753 | 4/1931 | Replogle | 285/354 X |
| 2,146,311 | 2/1939 | Pittman et al. | 175/361 |
| 2,282,734 | 5/1942 | Masoner | 137/122 |
| 2,405,927 | 8/1946 | Tornblom | 138/42 |
| 2,414,995 | 1/1947 | Wurzburger | 285/354 X |
| 2,423,122 | 7/1947 | Stephens | 285/354 X |
| 2,658,625 | 11/1953 | Rafferty | 210/448 X |
| 2,835,722 | 5/1958 | Appleton | 174/59 |
| 3,356,255 | 12/1967 | Zavertnik et al. | 220/88.2 |
| 3,398,830 | 8/1968 | Hornquist | 210/446 X |
| 4,467,136 | 8/1984 | Wium | 174/50 |
| 5,492,143 | 2/1996 | Cooper et al. | 210/448 X |

OTHER PUBLICATIONS

"Drains and Breathers", p. 8F-8, Catalog published by Cooper Industries, Inc., Jan. 1995.

"Hazardous Location Sealing Fittings for Tray Cable", p. B35, Catalog published by O-Z/Gedney, Farmington, CT 08034, Sep. 1994.

"ECDB Combination Drain/Breather: Explosion Proof, Dust-Ignition Proof Thread/Joint Lubricants", p. 17, Catalog published by Appleton Electric Co., Chicago, IL 60657, Oct. 1993.

*Primary Examiner*—Kristine L. Kincaid
*Assistant Examiner*—Dean A. Reichard
*Attorney, Agent, or Firm*—Conley, Rose & Tayon, P.C.

[57] ABSTRACT

A low point drain for draining accumulated water from electrical conduit systems that are located in non-hazardous environments is disclosed. The drain includes a threaded coupling suitable for connection to a tapped opening in an electrical conduit, or a conventional "T" or elbow fitting or an electrical enclosure or junction box. The drain also includes an end cap attached to the other end of the coupling, a safety washer and a screen assembly that is retained within the end cap. The end cap has an interior lip that defines an opening through which the water may drain. The screen assembly includes a grommet that is held securely against the coupling end and a frustoconical screen that protrudes through the end cap opening. When the drain is installed at a low point in the conduit system, condensate that forms in the system flows out the drain aperture and screen by the action of gravity. The screen assembly also serves to exclude vermin and debris and provides a visual indication when rust or debris has accumulated to an extent requiring that the drain be cleaned.

26 Claims, 2 Drawing Sheets

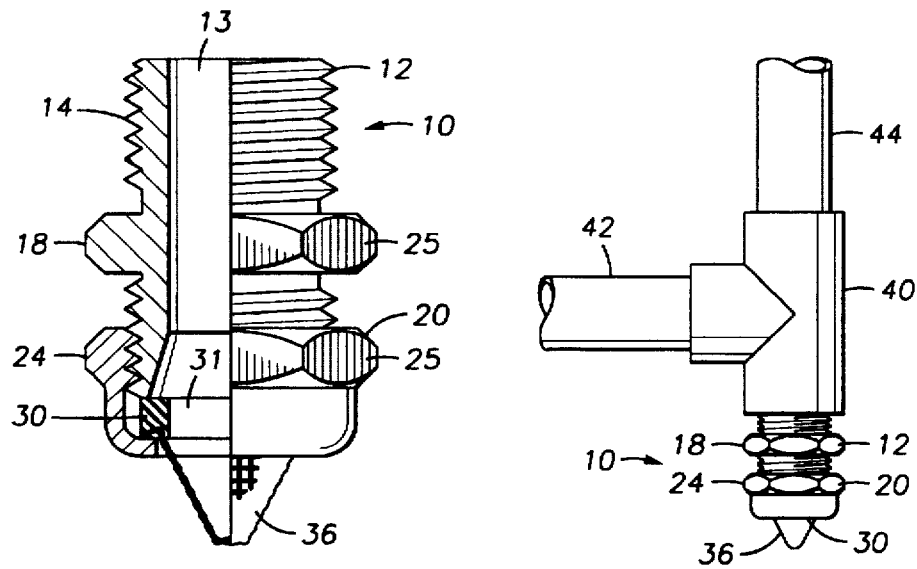
*FIG. 1*   *FIG. 3*
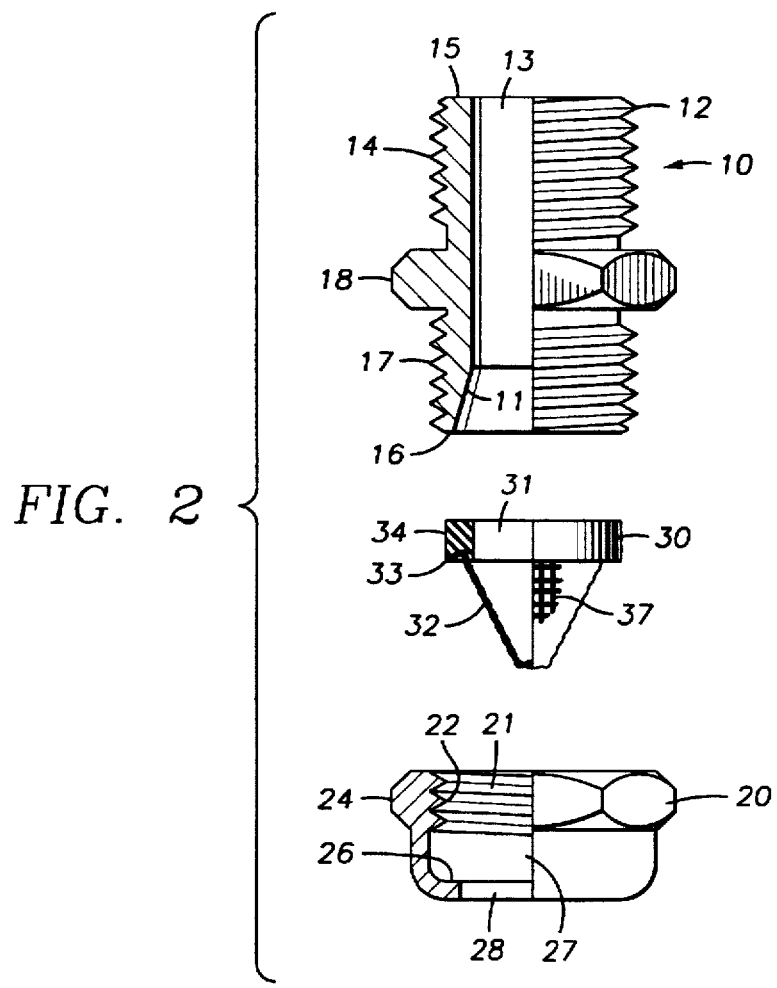
*FIG. 2*

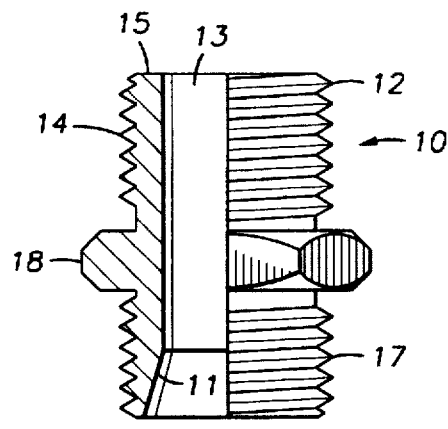
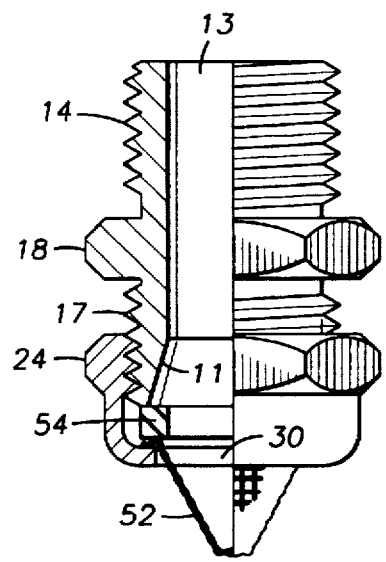
FIG. 5A
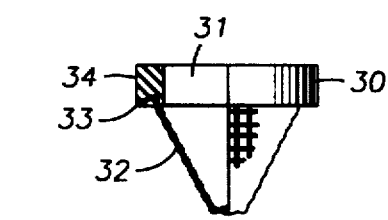
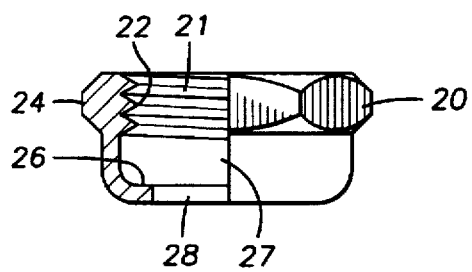
FIG. 6
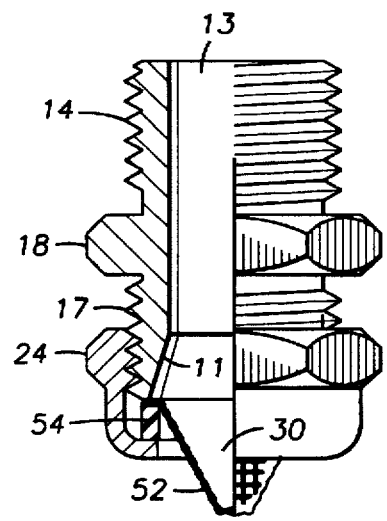
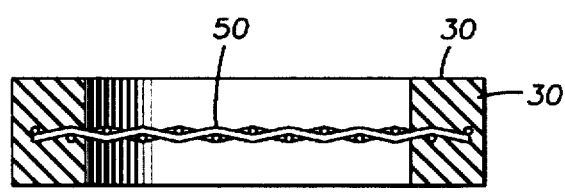
FIG. 4
FIG. 5B 5,796,035

1

CONDUIT DRAIN FOR USE IN NON-HAZARDOUS LOCATIONS

BACKGROUND OF THE INVENTION present invention relates generally to conduit installations containing electrical conductors, and more particularly to low-point drains for removing water or condensation from such electrical conduit systems that are situated in non-hazardous locations.

In commercial and industrial construction, it is common practice to contain electrical wiring in metal, or sometimes plastic, conduits. Even in relatively dry locations, moisture typically forms on the interior walls of the conduit due to condensation of water vapor in the air. In installations where metal conduits are employed, corrosion and premature deterioration of the conduit material may result. Further, an accumulation of water in the conduit system may result in creating an electrical short circuit.

Since it is for these reasons undesirable to have water accumulating inside the conduits, in situations where there are no surrounding flammable vapors or particles that could be ignited by a spark within the electrical conduit system, the problem may be eliminated by simply providing an open fitting or even a hole at various low points in the conduit system. One difficulty with merely introducing a drain hole in the metal conduit or a metal enclosure is that the hole tends to rust out and accelerate rusting of the adjacent portions of the conduit. Further, any opening in the conduit system is undesirable as it may encourage or permit insects or rodents to enter the conduit system and destroy or damage the electrical insulation.

Another conventional way of draining electrical conduit systems is to install an explosion-proof drain fitting. Use of a fitting of this type is mandatory where the installation site is designated as hazardous due to the presence of explosive vapors or dust. Standardized classifications for the various types of hazardous locations have been adopted and assigned by regulatory agencies according to the nature and type of hazard that is generally present or that may occasionally be present. For instance, at locations where oil or gas wells are being drilled or where petroleum products are being recovered, refined or processed, flammable gases may be present, including mixtures of oxygen, methane, ethane, propane, hydrogen sulfide and others. Highly flammable atmospheres may also be present in industrial areas where large quantities of flammable dust are present, such as in grain handling facilities or pulp and paper mills.

Because electrical wires and components, by their nature, may generate heat and sparks sufficient to ignite a flammable gas or other flammable mixture under even normal operating conditions, special precautions must be taken in hazardous locations in order to keep the wiring and other components isolated from the environment. At the same time, however, it is desirable to allow the conduits in such hazardous locations to drain. Presently, there are various conduit fittings and accessories commercially available that serve as low point drains for conduit systems located in hazardous locations. One such explosion-proof drain fitting is described in U.S. Pat. No. 4,467,136, issued to Wium, and has an interior filled with a sealing compound and an auxiliary member that can be oriented relative to the position of the conduit for better filling and draining. U.S. Pat. No. 2,405,927, issued to Tornblom, discloses a flame tight drain consisting of a tortious helical screw thread outlet passage that is intended to permit water to seep out, but to deter outward passage of a flame. U.S. Pat. No. 2,835,722. issued to Appleton, discloses another screw thread-type drain for an explosion-proof enclosure employing a hardened sealing compound.

Conventional explosion-proof fittings employed as low point drains often contain shot or baffles as the insulating material. Unfortunately, the soap or lubricant that is used to reduce friction when pulling wires through the conduit run tends to collect in these fittings and frequently causes the drain to clog and prevents it from operating for its intended purpose.

Furthermore, in non-classified locations there is no need to install elaborate and expensive explosion proof fittings. Nevertheless, because it is undesirable to leave an open drain hole in the system, it is common practice to employ one of the commercially available explosion-proof drain fittings despite its relatively high cost and despite the tendency of certain of these fittings to become clogged. This is due primarily to lack of availability of a suitable nonhazardous duty drain assembly. Use of an explosion-proof drain in this situation, however, adds unnecessary labor, materials and expense to the installation of the electrical system. Some types of explosion-proof drains also require the additional installation of special sealants or breather assemblies to allow adequate ventilation within the system. The industry would welcome a low cost, simple-to-install fitting that performs as a low point drain and breather device in non-hazardous locations, especially one that is free from internal baffles, special threads and sealants, and one that is easily maintained.

SUMMARY OF THE INVENTION

The present invention provides a low point drain assembly for removing accumulated water from electrical conduit systems that are located in non-hazardous environments. The drain assembly includes a tubular coupling having a throughbore and upper and lower ends having externally threaded portions. The invention further includes an end cap with an interior bowl with an internally threaded upper portion for threadedly engaging a threaded end of the coupling. The end cap includes an aperture in the bottom of the bowl, and a screen member is disposed in the bowl between the bowl bottom and the lower end of the coupling. According to the invention, the throughbore in the coupling, the screen member and the aperture in the end cap form a passageway for water to drain from the conduit system.

In one embodiment of the invention, the screen includes an annular resilient ring having an aperture aligned with the aperture in the bowl bottom, and a downwardly extending sieve having a frustoconical shape extending through the aperture of the bowl bottom. The drain assembly may also include tool engaging surfaces, such as wrench flats, on the coupling to permit the coupling to be threaded into a tapped opening in the conduit system, and may also include similar tool engaging surfaces on the end cap useful when threading the end cap onto the end of the threaded coupling. It is preferred that the screen member and resilient ring be formed as a unitary member, such as by embedding the base of the screen member in the resilient ring, and that a safety ring be positioned between the screen assembly and the coupling end.

When the drain assembly is installed at a low point in a conduit system, condensate that forms in the conduit system flows out the drain aperture and through the screen by the action of gravity. The screen prevents entry of insects, rodents or debris into the conduit system. It additionally acts as a trap or catchbasin for sediment or other debris and, without blocking water flow through the drain, provides a visible indication as to the need to remove and clean the screen. The safety ring prevents a service personnel's tool or finger from entering the conduit and contacting an electrical component. Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 1 is an elevation view, partly in cross section, of an embodiment of the drain of the present invention;

FIG. 2 is an exploded elevational view of the drain of FIG. 1;

FIG. 3 is an elevation view of the drain of FIG. 1 attached with a "T" connector to a vertical and a horizontal length of electrical conduit;

FIG. 4 is an elevation view, in cross-section, of an alternative embodiment of a screen assembly used in the drain of FIG. 1;

FIG. 5A is an elevation view, in cross-section, of an alternative embodiment of the drain of FIG. 1 using a separate screen and washer.

FIG. 5B is another alternative embodiment of the drain of FIG. 1.

FIG. 6 is an exploded elevational view of another alternative embodiment of the drain of the present invention.

DESCRIPTION OF PREFERRED EMBODIMENTS

Referring first to FIGS. 1 and 2, the drain 10 of the present invention generally includes a generally tubular coupling 12, a cowling or end cap 20 and a screen assembly 30. Coupling 12 may be a conventional plumbing union having an upper end 15, lower end 16 and a throughbore 13. Coupling 12 further includes upper threaded portion 14, lower threaded portion 17 and, preferably, a tool engaging surface 18, such as a hexagonal wrench-type fitting disposed between portions 14 and 17. Coupling 12 is preferably made of rigid galvanized steel, PVC or other suitable material meeting applicable electrical codes for use in conduit systems in non-hazardous areas. Throughbore 13 may be of a continuous diameter, or may include tapered sides 11, as shown in FIG. 2.

End cap 20 includes a bowl or central bore 21 having a bowl bottom 27 and an internally threaded segment 22 sized and adapted for threadingly engaging lower threaded portion 17 of coupling 12. Bowl bottom 27 includes annular lip 26 disposed about a central orifice or aperture 28 which serves as the water outlet from drain 10. End cap 20 further includes a tool engaging surface 24, which may be similar to surface 18 and include a plurality of wrench flats such as 25 (FIG. 1). End cap 20 is preferably made of a like material to that used to form coupling 12.

Screen assembly 30 includes screen 32 and elastomeric washer or grommet 34. Grommet 34 includes aperture 31 and may be made of rubber, neoprene, or any other suitable resilient material. Screen 32 preferably includes circular base 33 and a sieve portion 37 attached to base 33. Sieve portion 37 is frustoconical in shape and extends downwardly through aperture 28 away from base 33 to form a catchbasin 36. Base 33 preferably is embedded within grommet 34 to form a unitary or one-piece screen assembly 30.

Referring still to FIGS. 1 and 2, conduit drain 10 is assembled with screen assembly 30 disposed within bowl 21 of end member 20 such that sieve portion 37 extends downwardly through aperture 28. With grommet 34 resting against lip 26 of end cap 20, and with its aperture 31 aligned with end cap aperture 28, threaded portion 22 is threaded about lower threaded portion 17 of coupling 12. As end cap 20 is tightened onto coupling 12, grommet 34 is squeezed and retained between lower end 16 of coupling 12 and lip 26 of end cap 20, best shown in FIG. 1.

When the drain 10 is installed at a low point in a conduit run or in the bottom of an electrical box or enclosure, condensate that forms in the adjacent conduits or box flows out drain aperture 28 and screen 32 by the action of gravity. The downwardly extending and preferably frustoconically shaped screen 32 provides a catchbasin 36 that collects rust, scale or other debris. Screen 32 is preferably made of a corrosion-proof material, such as stainless steel, but it may also be made of plastic or any other suitable material. In any case, screen 32 should be of a mesh size that will permit water to flow out freely, yet prevent debris, insects or rodents from being able to enter from the outside.

Because the drain 10 is intended for use in non-hazardous or unclassified areas, no special threads or sealants are required on coupling 12 or end cap 20, and no elaborate labyrinth or interior baffles are needed within drain 10. Instead, an advantage of the present invention is that the bores or apertures 13, 31 and 28 (of coupling 12, screen assembly 30 and end cap 20, respectively) are free from such baffles and thus are not prone to becoming clogged with debris. The end cap 20 of drain 10 may be easily removed to permit screen assembly 30 to be flushed out or otherwise cleaned to remove any accumulated debris. Likewise, screen assembly 30 may readily be replaced if necessary. Another advantage of the present invention over explosion-proof assemblies used in non-hazardous locations is that the present invention provides a conduit system that is open to the air, provides better ventilation, and therefore, makes the system less prone to the formation and accumulation of condensation.

A typical installation for drain 10 is shown in FIG. 3. As shown, drain 10 is connected to a conduit installation in a vertical orientation by a conventional "T" fitting 40, in order to situate drain 10 at a low point along the conduit run of horizontal conduit 42 and vertical conduit 44. So positioned, water or condensation in conduits 42,44 can travel downward through "T" fitting 40 and coupling 12 and out the aperture 28 and screen 32. The connections are adjusted to the desired tightness via tool engaging surfaces 18 and 24. Screen 32 prevents insects or small rodents from entering the conduit system and causing damage to internal wiring. As debris collects in catchbasin 36 of screen assembly 20, it will be visible, alerting maintenance personnel to remove drain 10 for cleaning of screen assembly 30. Drain 10 may also be installed in an elbow fitting, or in a drilled and tapped opening in a junction box or other electrical enclosure.

Referring momentarily to FIG. 4, an alternative embodiment of screen assembly 30 is shown. In this embodiment, screen assembly 30 includes resilient grommet 34 as previously described and flat, circular screen 50. Screen 50 allows condensation to pass therethrough in the identified manner precisely described with reference to screen 32. Screen 50 may be preferred for ease of manufacture and for cost considerations.

FIG. 5 shows still another alternative embodiment of the present invention. In this embodiment, upper threaded portion 14 and lower threaded portion 17 of coupling 12 have differing outer diameters. Such a design permits the same screen assembly 30 and end cap 20 to be employed in drain assembly 10, without regard to the size of conduit fitting (or drilled and tapped opening in an electrical enclosure) into which drain 10 is to be installed. Also shown in this embodiment is an alternative screen assembly 30 which includes a flat, circular screen 52 and a separate, unattached resilient washer 54. As shown, in this embodiment, screen 52 and resilient washer 54 are placed in bowl 21 and retained by end 16 of coupling 12 against lip 26 and FIG. 5A, respectively of end cap 20. Screen 52 may be disposed either above or below resilient washer 54 (shown in FIG. 5B). Screen 52 and washer 54 of this embodiment may also be preferred in some instances for ease of manufacture or cost considerations.

With reference now to FIG. 6, another alternative embodiment of the drain assembly of FIG. 1 is shown. As an additional feature, this embodiment provides a thin safety ring or washer 60 between the screen assembly 30 and coupling end 16. Washer 60 is preferably made of stainless steel, but it may be made of any suitable noncorrosive material. Aperture 35 of washer 60 is preferably about 0.25" in diameter, but it may be larger or smaller, if desired, as long as it is able to prevent a service person's finger or tool from extending through aperture 35 and reaching beyond coupling 12. This embodiment may be preferred for some installations, for example, where a short coupling 12 is used, to prevent a person from contacting a live component or energized electrical wire by pushing a tool or a finger through the screen 32 and into the conduit or electrical box, when examining or trying to dislodge debris. The safety washer 60 may be combined with resilient washer 54 (shown in FIGS. 5A and B), if desired.

While the preferred embodiments of the invention have been shown and described, modifications thereof can be made by one skilled in the art without departing from the spirit and teachings of the invention. The embodiments described herein are exemplary only, and are not limiting. Many variations and modifications of the invention and apparatus disclosed herein are possible and are within the scope of the invention. Accordingly, the scope of protection is not limited by the description set out above, but is only limited by the claims which follow, that scope including all equivalents of the subject matter of the claims.

What is claimed is:

1. A drain assembly for an electrical conduit system comprising:

a coupling having a throughbore and an upper end and a lower end, said upper and lower ends each having an exteriorly-threaded portion and said throughbore having at least one nontortuous fluid path;

an end cap having an upper end and a lower end and an interior bowl, said bowl including an internally threaded upper portion adjacent said upper end of said end cap threadedly engaging said lower end of said coupling, and including a bottom adjacent said lower end of said end cap, said bottom having an aperture; and a screen member disposed in said bowl between said lower end of said coupling and said bowl bottom, said fluid path of said throughbore, said screen member and said aperture forming a passageway for water to drain from the conduit system.

2. The drain assembly of claim 1 wherein said screen member comprises a screen and an annular resilient ring having an aperture aligned with said aperture in said bowl bottom.

3. The drain assembly of claim 1 wherein said screen member comprises a sieve having a frustoconical shape.

4. The drain assembly of claim 1 wherein said screen member has a downwardly-extending sieve extending through said aperture.

5. The drain assembly of claim 1 wherein said bowl bottom includes an annular lip defining said aperture and wherein said screen member comprises an annular resilient ring having an aperture aligned with said aperture in said bowl bottom.

6. The drain assembly of claim 1 further comprising a rigid safety washer disposed between said screen member and said coupling lower end.

7. The drain assembly of claim 6 wherein said safety washer has an aperture about 0.25 inch in diameter.

8. The drain assembly of claim 1 wherein said coupling includes tool engaging surfaces disposed between said exteriorly-threaded portions.

9. The drain assembly of claim 8 wherein said end cap includes an exterior surface having tool engaging surfaces.

10. The drain assembly of claim 2 wherein said screen has a base portion fixedly joined to said resilient ring.

11. A drain assembly for an electrical conduit system comprising:

a coupling having a throughbore and an upper end and a lower end, said upper and lower ends each having an exteriorly-threaded portion;

an end cap having an upper and a lower end and an interior bowl, said bowl including an internally threaded upper portion adjacent said upper end threadedly engaging said lower end of said coupling, and including a bottom adjacent said lower end, said bottom having an aperture; and a screen member disposed in said bowl between said lower end of said coupling and said bowl bottom, said screen member having a screen and an annular resilient ring having an aperture aligned with said aperture in said bowl bottom, said screen having a base portion embedded within said resilient ring, said throughbore, said screen member and said apertures forming a passageway for water to drain from the conduit system.

12. The drain assembly of claim 2 wherein said screen is substantially flat.

13. The drain assembly of claim 2 wherein said screen is disposed between said resilient ring and said aperture in said bowl bottom.

14. The drain assembly of claim 2 wherein said screen is disposed between the lower end of said coupling and said resilient ring.

15. A drain assembly for installation in a tapped opening in an electrical conduit system, comprising:

a coupling having a central throughbore of a first given diameter, an exterior surface, and an upper end and a lower end, said exterior surface including a threaded portion adjacent each of said upper and lower ends and wrench flats disposed between said upper and lower ends;

an end cap having upper and lower ends, a central bowl, and an orifice in said lower end, said bowl including an internally threaded portion threadingly engaging said lower end of said coupling;

a nonelastomeric washer disposed between said lower end of said coupling and said lower end of said end cap, said washer having a first aperture of a second given diameter that is less than said first given diameter;

a screen member disposed in said bowl between said lower end of said coupling and said lower end of said end cap, said screen member including a resilient ring having a second aperture generally aligned with said orifice of said end cap and said throughbore of said coupling and a screen disposed across said second aperture;

said throughbore of said coupling, said first and second apertures, said orifice of said end cap and said screen member forming a passageway for condensate to drain from the conduit system.

16. The drain assembly of claim 15 wherein said screen includes a frustoconical extension extending through said orifice in said end cap forming a catchbasin.

17. The drain assembly of claim 15 wherein said end cap includes an exterior surface having wrench flats formed thereon.

18. The drain assembly of claim 15 wherein said resilient ring and said screen are attached.

19. A drain assembly for installation in a tapped opening in an electrical conduit system, comprising:

a coupling having a central throughbore, an exterior surface, and an upper end and a lower end, said exterior surface including a threaded portion adjacent each of said upper and lower ends and wrench flats disposed between said upper and lower ends;

an end cap having upper and lower ends, a central bowl, and an orifice in said lower end, said bowl including an internally threaded portion threadingly engaging said lower end of said coupling; and a screen member disposed in said bowl between said lower end of said coupling and said lower end of said end cap, said screen member including a resilient ring having a central aperture aligned with said orifice of said end cap and said throughbore of said coupling and a screen disposed across said aperture and having a base portion embedded in said resilient ring;

said throughbore of said coupling, said orifice of said end cap and said screen member forming a passageway for condensate to drain from the conduit system.

20. The drain assembly of claim 19 wherein said end cap includes an annular lip disposed about said orifice and wherein said lip and said lower end of said coupling compress said resilient ring therebetween.

21. The drain assembly of claim 20 wherein said screen includes a frustoconical extension extending through said orifice in said end cap.

22. The drain assembly of claim 15 wherein said coupling comprises a generally tubular member and wherein said upper and lower ends of said coupling have outer diameters that differ in size.

23. A drain assembly for an electrical conduit system comprising:

a coupling comprising a non-tortuous fluid pathway therethrough and upper and lower ends, said upper end having threads for threadingly engaging the conduit system;

an end cap having an upper end and a lower end and an interior bowl, said end cap attached at its upper end to said lower end of said coupling, said bowl including a bottom having a first aperture formed therethrough;

a screen member disposed between said lower end of said coupling and said bowl bottom;

a restricting member disposed between said lower end of said coupling and said bowl bottom, said restricting member having a second aperture therein;

said non-tortuous fluid pathway, said screen member and said first and second apertures forming a passageway for water to drain from the conduit system.

24. The drain assembly of claim 23 wherein said restricting member is a nonelastomeric washer, and wherein said first and second apertures and said non-tortuous fluid pathway are substantially aligned.

25. The drain assembly of claim 23 wherein said coupling includes an interior surface forming a central throughbore, and wherein said non-tortuous fluid pathway has a diameter defined by said interior surface of said coupling.

26. The drain assembly of claim 23 wherein said screen member has a portion that extends through said first aperture and beyond said bowl bottom of said end cap.

* * * * *